May 17, 1966  H. J. WARMKESSEL  3,251,237
GEAR SHIFTING MECHANISM
Filed July 6, 1964
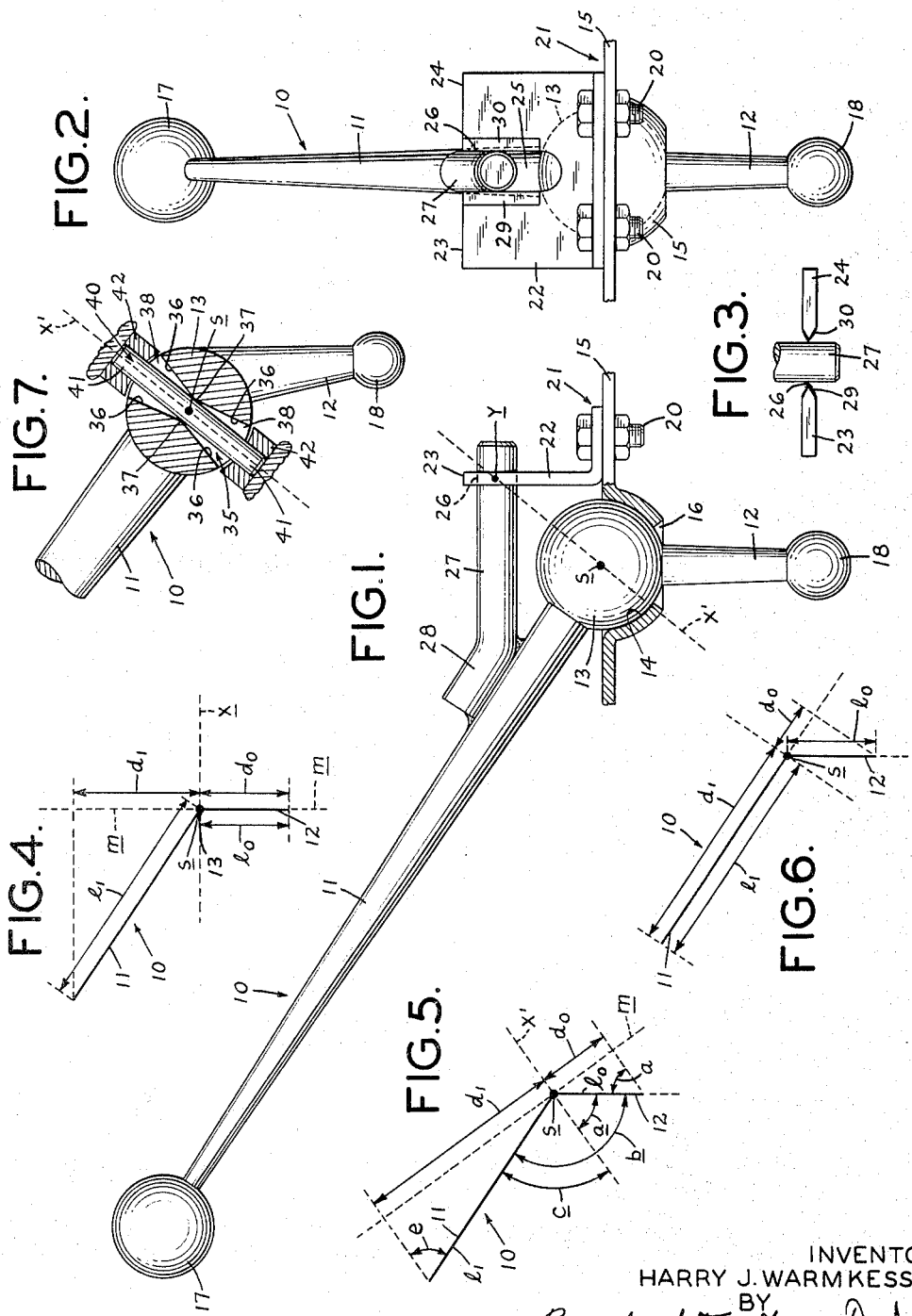
INVENTOR
HARRY J. WARMKESSEL
BY
Bruembaugh, Free, Graves & Donohue
HIS ATTORNEYS

United States Patent Office 3,251,237
Patented May 17, 1966

3,251,237
GEAR SHIFTING MECHANISM
Harry J. Warmkessel, Allentown, Pa., assignor to Mack Trucks, Inc., Montvale, N.J., a corporation of New York
Filed July 6, 1964, Ser. No. 380,535
7 Claims. (Cl. 74—473)

This invention relates to gear shift levers which are of the "stick" type, and wherein the output arm of the lever is at an obtuse angle to the input arm thereof.

An object of this invention is to improve the mechanical advantage provided by such lever for its component of angular motion transverse to the longitudinal shifting direction of the lever.

A further object of this invention is to reduce frictional forces opposing transverse shifting of the lever.

A still further object of this invention is to equalize the mechanical advantage (and travel ratio) characterizing transverse lever shifting with the mechanical advantage (and travel ratio) characterizing longitudinal shifting of the lever.

For a better understanding of the invention, reference is made to the following description of exemplary embodiments thereof and to the accompanying drawings wherein:

FIG. 1 is a side elevation of a "stick" type gear shift lever mechanism in accordance with the invention;

FIG. 2 is an end view of the mechanism of FIG. 1;

FIG. 3 is a fragmentary plan view of a detail of the FIG. 1 mechanism;

FIG. 4 is a schematic view in side elevation of a gear shift lever mechanism in accoradnce with the prior art;

FIG. 5 is a schematic view in side elevation of the FIG. 1 lever mechanism;

FIG. 6 is a schematic view in side elevation of a different adjustment of the FIG. 1 lever mechanism than that shown in FIG. 1; and FIG. 7 is a side view in cross section of a modification of the FIG. 1 mechanism.

Referring first to FIGS. 1 and 2, the reference numeral 10 designates a "stick" type gear shift lever for a motor vehicle. The lever 10 is comprised of an input arm 11, an output arm 12 and a spherical ball 13 by which the arms 11 and 12 are connected to form an obtuse angle having its vertex at the center $s$ of the ball.

The ball 13 is seated in a hemispherical socket 14 formed in a stationary lever mounting 15 and having in its bottom a hole 16 through which the arm 12 extends downwardly. The ball is maintained in its socket by a cover (not shown) having a hole therein through which arm 11 passes to join with the ball. The socket mounting of ball 13 permits angular movement of lever 10 about point $s$ in both the longitudinal plane (i.e., the plane of the drawing) and in a direction transverse to that plane. A knob 17 on the outer end of arm 11 is shifted by hand to position through the lever a gear selector ball 18 on the outer end of arm 12.

The lever 10 is adapted to shift gears in accordance with a standard H shifting pattern wherein transverse movement of ball 18 selects the desired shifter rail and subsequent longitudinal movement of the ball selects the desired gear associated with the previously chosen rail.

As so far described, the lever 10 and its mounting are conventional.

Referring now to FIG. 4, it has been the prior art practice for the shifting motions of lever 10 to be controlled by a pin (not shown) passing diametrally through ball 13 normal to both arms 11 and 12. The pin has opposite ends salient from opposite sides of the ball and received in close fitting relation in respective arcuate guide slots formed in the mounting structure around the ball. Those guide slots constrain the transverse angular movement of the mentioned pin so that it is limited to movement around a horizontal axis $x$ in the longitudinal plane and exactly or approximately normal to the output arm 12. The pin and slot arrangement permits lever 10 to be angularly moved longitudinally and transversely while preventing twisting of the lever about the axis of arm 11 or that of arm 12.

In FIG. 4, the input to output mecahnical advantage (of travel ratio) of the lever for its longitudinal component of motion is equal to $l_i/l_o$ where $l_i$ and $l_o$ are the lengths of, respectively, the arm 11 and the arm 12. For transverse lever motion however, the mechanical advantage (or travel ratio) is equal to $d_i/d_o$ where $d_i$ and $d_o$ are the projections of $l_i$ and $l_o$, respectively, on a plane $m$ passing through the center $s$ of ball 13 normal to axis $x$. Since in FIG. 4, the output arm 12 is in plane $m$, $d_o = l_o$. As shown, however, $d_i$ is less than $l_i$, wherefore $d_i/d_o$ is less than $l_i/l_o$. In other words, lever 10 provides less mechanical advantage in the transverse direction than in the longitudinal direction. Moreover, the shifting of the lever in the transverse direction is opposed by the force produced by the friction of the described pin in the described slots. Therefore, the hand force which must be erected on knob 17 to shift lever 10 transversely is usually substantially greater than the hand force required to shift the lever longitudinally.

Such imbalance between the hand loads needed to effect longitudinal and transverse shifting in the conventional FIG. 4 lever is eliminated by the FIG. 1 mechanism in a manner as follows. Secured to the lever mounting 15 by bolts 20 is a bracket 21 having an upstanding fork plate 22. The fork plate provides two tines 23 and 24 (FIG. 2) on opposite sides of a guide slot 25 formed in the plate in such manner that the slot is bisected by the longitudinal neutral plane of the lever (i.e., the plane of the FIG. 1 drawing). Received within slot 25 is a portion 26 of the forward end of a finger 27 of which the rear end 28 is rigidly secured (by, say, welding) to a portion of the input lever arm 11.

Evidently, the finger 27 is longitudinally movable back and forth in slot 25. Moreover, blunt "knife" edges 29 and 30 formed on, respectively, tines 23 and 24, at the sides of slot 25 (FIG. 3) and a small clearance between finger portion 26 and those edges permits an angular turning in the slot of that portion and a corresponding transverse movement in translation of the finger end 28. The tines 23 and 24 prevent, however, any substantial transverse movement in translation of the finger portion 26. Note that because of the knife edges on the tines and the rounded surface of finger 27, the finger portion 26 makes a point contact $y$ with the tine 23 or the tine 24.

Because the finger portion 26 can angularly turn in slot 25 but is prevented by tines 23, 24 from moving transversely in translation, the finger 27 and the tines cooperate at the point $y$ to determine one point of an axis $x'$ around which the lever 10 is constrained to move when the lever angular motion is transverse. Another point $s$ of such axis is determined by ball 13 and its mounting 15. The two points $y$ and $s$ fully determine the alignment of axis $x'$ so that it lies within the plane of the obtuse angle between arms 11 and 12 and, within that angle, is at an acute angle to output arm 12. By so constraining the transverse angular movement of lever 10 and by selecting a proper value for such acute angle, the lever 10 can be made to yield the same mechanical advantage (and travel ratio) in transverse motion as in longitudinal motion or any other preselected relationship between these mechanical advantages (while at the same time, being prevented from undergoing any substantial twisting around the axis of arm 11 or that of arm 12). How those mechanical advantages may be equalized is explained in connection with FIG. 5.

Referring to the last named figure, the mechanical advantage is, as before $l_i/l_o$ for longitudinal movement and $d_i/d_o$ for transverse movement. Inasmuch, however, as the axis for transverse angular movement is now at an acute angle to output arm 12, $d_i$ and $d_o$ in FIG. 5 are, respectively, greater and lesser than they are in FIG. 4. Therefore, the ratio $d_i/d_o$ is greater in FIG. 5 than in FIG. 4, and, by selecting a proper value for the mentioned actuate angle, $d_i/d_o$ can be made equal to $l_i/l_o$.

More specifically, from inspection of FIG. 5 it will be seen that:

$$d_o = l_o \sin a \quad (1)$$

where $\alpha$ is the acute angle between $x'$ and arm 12. Further, it will be seen that where $b$ is the obtuse angle between arms 11 and 12, angle $c$ is equal to $(b-a)$ and angle $e$ is equal to angle $c$, wherefore:

$$d_i = l_i \sin (b-a) \quad (2)$$

From Expressions 1 and 2, when angle $e$ equals angle $a$, the relationship:

$$\frac{l_i}{l_o} = \frac{d_i}{d_o} \quad (3)$$

can be rewritten as:

$$\frac{l_i \sin (b-a)}{l_o \sin a} = \frac{d_i}{d_o} \quad (4)$$

which is satisfied when:

$$\sin (b-a) = \sin a \quad (5)$$

or, in other words, when acute angle $a$ is one-half of obtuse angle $b$. For that relation between the angles $a$ and $b$, the transverse mechanical advantage of lever 10 is equal to the longitudinal mechanical advantage thereof. Further, when $a$ equals $b/2$, the longitudinal and transverse travel ratios of lever 10 are equalized, travel ratio being defined as the linear movement (over an arc) of knob 17 divided by the resultant linear movement (over an arc) of ball 18. Still further (and in contrast to the described pin and slot arrangement of the FIG. 1 lever), the bracket 21 and finger 27 constrain the lever 10 to move transversely around an axis (i.e., axis $x$) without concurrently generating any substantial amount of friction opposing movement.

In certain instances, it may be desirable for the transverse mechanical advantage $d_i/d_o$ to be even greater than the longitudinal mechanical advantage $l_i/l_o$. The ratio $d_i/d_o$ may be so increased by redesigning bracket 21 and relocating the finger 27 so as to shift point $y$ towards arm 11 along a circular arc having its center at the ball center $s$. The effect of such shift is to lessen the acute angle $a$ between axis $x'$ and output arm 12, to thereby provide that:

$$\sin (b-a) > \sin a \quad (6)$$

In lieu of fixing axis $x'$ by the means shown in FIG. 1, such axis may be fixed by forming in the ball 13 a diametral bore 35 (FIG. 7) of which the axis coincides with $x'$. As shown, the bore is characterized on opposite sides of its axial center and on either side (in the longitudinal plane) of axis $x'$ by tapered planar side walls 36 which meet at such center at opposite blunted knife edges 37. The side walls 36 cause the bore dimension (in the longitudinal plane) to progressively increase away from ball center $s$ in each of the two opposite directions along axis $x'$.

Besides those tapered side walls 36, the bore has on each side of the plane defined by arms 11 and 12 a pair of longitudinal planar side walls 38 (only one shown in FIG. 7) which extend between and are normal to walls 36, are parallel to the longitudinal plane and are spaced apart from each other by slightly less than the distance between the two knife edges 37. Thus, the bore 35 can be considered as comprised of two wedge-shaped slots of which the narrower ends meet and merge at the knife edges 37 at the axial center of the bore.

Received in bore 35 is a guide pin 40 coaxial with axis $x'$ and having opposite ends 41 salient from the opposite ends of the bore. The two pin ends 41 are received in holes formed in a pin mounting structure 42 by which pin 40 is held stationary in translatory and angular position. The diameter of the pin is of a value to provide a moderate clearance between the pin and knife edges 37 and a lesser amount of clearance between the pin and the bore side walls 38.

In operation, the tapered side walls 36 of bore 35, the knife edges 37 and the clearance thereof with pin 40 are such as to permit the lever 10 to be longitudinally rocked relative to pin 40. That is, the lever can undergo a longitudinal shifting movement which is so constrained that the fulcrum point of the movement is at or nearly at the center $s$ of ball 13. Moreover, the bore and pin combination of FIG. 7 permits the lever 10 to undergo a transverse shifting movement which is constrained to be about the axis $x'$. The lever is, however, prevented from twisting about the axis of arm 11 or that of arm 12. As in the case of the FIG. 1 mechanism, in the FIG. 7 embodiment the axis $x'$ lies in the plane of the obtuse angles between arms 11 and 12 so as to be at an acute angle to arm 12. Moreover, as before, the axis $x'$ may be aligned so as to bisect the obtuse angle $b$ or to be normal to arm 12 or to lie somewhere in between. The FIG. 7 embodiment has substantially the same advantages as that of FIG. 1 except that the FIG. 7 lever guide means (bore and pin) is not quite as free of friction as the FIG. 1 lever guide means (bracket and finger).

The above described embodiments being exemplary embodiments only, it is to be understood that additions thereto, omissions therefrom and modifications thereof can be made without departing from the spirit of the invention, and that the invention comprehends embodiments differing in form or detail from those specifically described. Accordingly, the invention is not to be considered as limited save as is consonant with the recitals of the following claims.

What is claimed:

1. Gear shift apparatus comprising, a rigid gear-shift lever comprised of an input arm, an output arm, and means joining said arms at an obtuse angle, fulcrum means by which said lever is pivotally mounted to be angularly movable around a point at the vertex of said angle with both longitudinal and transverse components of motion, and lever guide means by which said transverse component of angular motion is constrained to be around an axis passing through said point in the plane of said obtuse angle and disposed within said obtuse angle at an acute angle to said output arm.

2. Gear shift apparatus comprising, a rigid gear-shift lever comprised of an input arm, and output arm, and means joining said arms at an obtuse angle, fulcrum means by which said lever is pivotally mounted to be angularly movable around a point at the vertex of said angle with both longitudinal and transverse components of motion, and lever guide means by which said transverse component of angular motion is constrained to be around an axis passing through said point in the plane of said obtuse angle and disposed within said obtuse angle at an acute angle to said output arm, said obtuse and acute angles satisfying the relation:

$$\sin (b-a) > \sin a$$

where $a$ and $b$ are the angular values of, respectively, said acute angle and said obtuse angle.

3. Gear shift apparatus as in claim 2 wherein $$\sin (b-a) = \sin a$$

whereby said lever provides similar mechanical advantage for said longitudinal and transverse components of motion.

4. Gear shift apparatus as in claim 2 wherein said axis is normal to said input arm.

5. Gear shift apparatus comprising, a rigid gear-shift lever comprised of an input arm, an output arm and a spherical ball having a center and joining said arms at an obtuse angle, said ball having therethrough a diametral bore with an axis in the plane of said obtuse angle and disposed within said obtuse angle at an acute angle to said output arm, and said bore being of substantially constant dimension normal to said plane and being rendered of progressively increasing dimension in said plane in each axial direction away from said center by tapered side walls of which two are on each side of said center and diverge from each other and from said axis with axial distance from said center, socket means in which said ball is seated and by which said lever is pivotally mounted to be angularly movable around said center with both longitudinal and transverse components of motion, guide pin means coaxial with said axis and received in said bore in close fitting relation in said plane with only the axially central portion of said bore, said pin means having opposite ends salient from the opposite ends of said bore, and support means by which said pin ends are held stationary, whereby the transverse motion component of said lever is constrained to be about said axis.

6. Gear shift apparatus comprising, a rigid gear-shift lever comprised of an input arm, an output arm and a spherical ball joining said arms at an obtuse angle, socket means in which said ball is seated and by which said lever is pivotally mounted to be angularly movable around said center with both longitudinal and transverse components of motion, bracket means adjacent said lever and providing a guide slot in the longitudinal motion plane of said lever, finger means on one of said arms and having an outward portion received in said slot such that said finger means is longitudinally movable in said slot and is transversely movable in translation at such arm which being held transversely immovable in translation at said portion by said bracket means, said transverse component of angular motion of said lever being thereby constrained by said socket means, bracket means and finger means to be around an axis passing through the center of said ball in the plane of said obtuse angle and disposed within said obtuse angle at an acute angle to said output arm.

7. Gear shift apparatus as in claim 6 in which said bracket means is on the side of said lever away from said obtuse angle, and in which said finger means is on said input arm.

References Cited by the Examiner
UNITED STATES PATENTS 1,305,063   5/1919   Church _____ 74—477
1,635,526   7/1927   Austin _____ 74—473

MILTON KAUFMAN, *Primary Examiner.*